April 27, 1965   F. A. DE PUYDT ETAL   3,180,455
TRAILER HITCH AND BRAKE ACTUATING ASSEMBLY
Filed Feb. 27, 1963   2 Sheets-Sheet 1
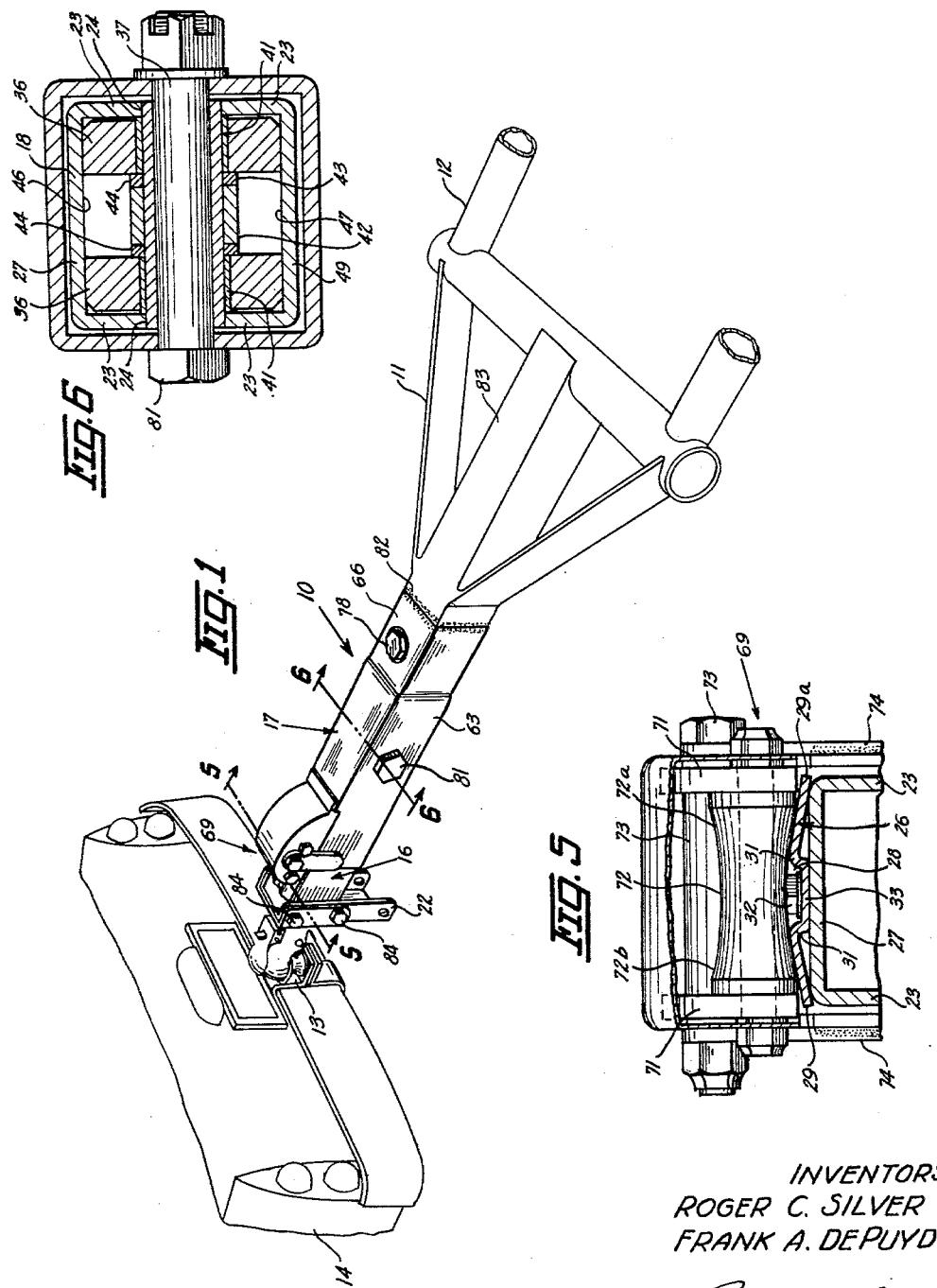
INVENTORS.
ROGER C. SILVER
FRANK A. DE PUYDT
BY *Rudolph L. Powell*
ATTORNEY.

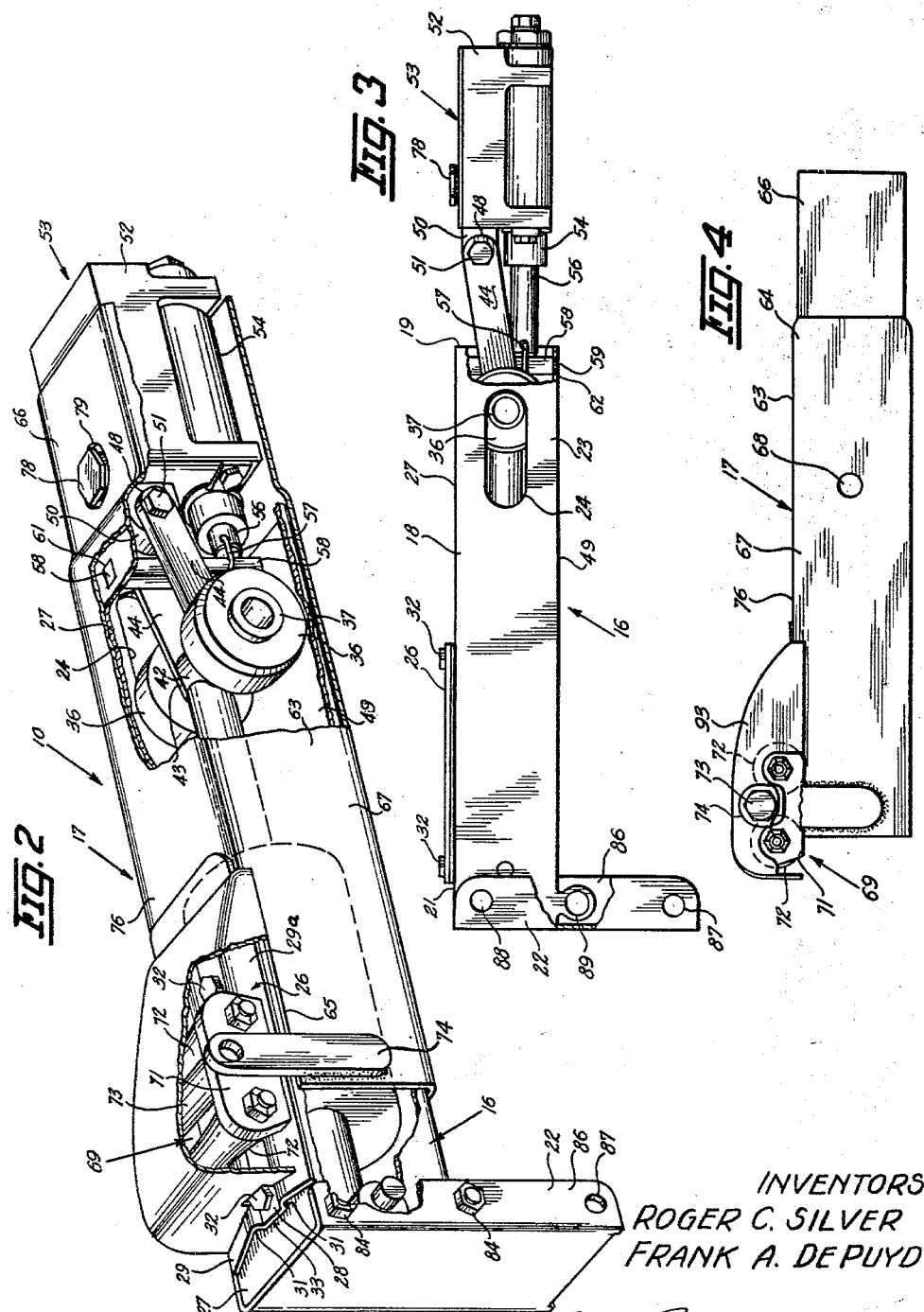

United States Patent Office 3,180,455
Patented Apr. 27, 1965

3,180,455
TRAILER HITCH AND BRAKE ACTUATING
ASSEMBLY
Frank A. De Puydt and Roger C. Silver, Des Moines,
Iowa, assignors to Dico Corporation, Des Moines, Iowa,
a corporation of Iowa
Filed Feb. 27, 1963, Ser. No. 261,280
3 Claims. (Cl. 188—112)

This invention relates generally to vehicle braking devices and in particular to a device including a tongue for a trailer and an associated mechanism for actuating the brakes of the trailer.

An object of this invention is to provide an improved brake and hitch assembly for a trailer vehicle.

Another object of this invention is to provide a trailer hitch and brake actuating assembly wherein relatively movable telescoping hitch members, responsive in operation to the overrunning tendency or inertia effect of the trailer to actuate the trailer brakes, are freely movable regardless of any towed position of the trailer.

A further object of this invention is to provide a trailer hitch and brake mechanism wherein relatively movable telescoping hitch members are continuously maintained in a guided clearance relation for relative longitudinal movement.

Another object of this invention is to provide a trailer hitch and brake mechanism assembly wherein a pair of relatively movable telescoping hitch members are provided with coacting guide means to maintain the hitch members in a relative longitudinally centered spaced relation over the full extent of their telescopic movement, whereby the hitch members function as an extensible beam capable of receiving an excessive side thrust or load without lateral deflection.

A further object of this invention is to provide a trailer hitch and associated brake actuating means which is of a compact and rugged construction and efficient in operation over a long service life.

Further objects, features and advantages of this invention will become apparent in connection with the accompanying drawings in which:

FIG. 1 is a perspective view of the trailer hitch and brake actuator device of this invention shown in assembly relation with a tractor vehicle;

FIG. 2 is an enlarged perspective view of the trailer hitch and brake actuating device with some parts broken away, and other parts shown in section for the purpose of clarity;

FIG. 3 is a side elevational view of a first hitch member and associated mechanism which forms part of the device of this invention;

FIG. 4 is a side elevational view of a second hitch member and the mechanism associated therewith, and FIGS. 5 and 6 are enlarged sectional detail views as seen along the lines 5—5 and 6—6, respectively, in FIG. 1.

Refering to the drawings the trailer hitch and brake actuating device of this invention, indicated generally at 10, is illustrated in FIG. 1 in assembly relation with the tongue structure 11 of a trailer vehicle, only a frame portion 12 of which is shown, and with a coupling 13 supported in a usual manner at the rear end of a tractor vehicle 14, shown as a passenger vehicle.

The device 10, as best appears in FIG. 2, includes a pair of inner and outer hitch assemblies 16 and 17, respectively, with the inner assembly 16 being receivable within the assembly 17 for relative telescopic movement. As shown in FIG. 3 the inner hitch assembly 16 includes a tubular casing member 18 open at its rear end 19 and having a front end 21 closed by a mounting plate 22 for the coupling 13. Spaced forwardly of the rear end 19 and formed in the side walls 23 of the tubular casing member 18 is a pair of oppositely arranged longitudinally extended slots 24. A track member 26 (FIGS. 2 and 5) extended longitudinally of the casing member 18 and of a width substantially equal to the transverse dimension of the top side 27 of the casing member 18, is connected to such top side adjacent the closed front end 21.

The track member 26 (FIGS. 2 and 5) is formed from a flat plate material so as to have a longitudinally extended groove 28 and a pair of guide sections 29 and 29a inclined downwardly in opposite directions from the corresponding side walls 31 of the groove 28. Screws or bolts 32 for securing the track member 26 to the top surface 27 of the casing 18 are inserted through corresponding openings (not shown) formed in the base 33 of the groove 28. It is seen, therefore, that the reversely inclined track sections 29 and 29a define a substantially convex upper surface for the track member 26.

Mounted within the rear end of the casing member 18 is a roller assembly (FIGS. 2, 3 and 6) which includes a pair of roller members 36 rotatably carried at the opposite ends of a tubular sleeve member 37. As best shown in FIG. 6 the tubular shaft 37 is of a length equal to the transverse dimension of the casing member 18 with the ends thereof positioned within the slots 24 formed in the casing side walls 23 so as to be supported thereby. Each roller 36 is provided with a corresponding bearing 41 for rotational movement relative to the sleeve shaft 37.

The rollers 36 (FIGS. 2 and 6) are maintained in a longitudinally spaced relation on the shaft 37 by a central spacing collar 42 arranged between the ends 43 of connecting links 44, the ends 43 being mounted about the shaft 37. As appears in FIG. 6 the rollers 36 are of a diameter corresponding substantially to the inner vertical dimension of the casing member 18 so as to be in rolling engagement with the inner surfaces 46 and 47 of the top and bottom walls 27 and 49, respectively, of the casing member 18. Additionally, the inner surfaces of the casing side walls 23 are in contact with a corresponding adjacent side of a roller 36. As a result the rollers 36 are held against longitudinal movement in one direction by the casing side walls 23 and in an opposite direction by the spacer and link assembly 42 and 43.

The ends 48 of the links 44 (FIGS. 2 and 3) remote from the rollers 36 are pivotally connected, as indicated at 51, to a forwardly projected lug 50 on the casing 52 of a combination cylinder and reservoir unit 53, which includes a cylinder assembly 54 having a piston 56 extended longitudinally of the casing 18 and extendable and retractable relative to the forward end of the casing 52. The unit 53 is spaced rearwardly from the casing member 18 and is is carried within the outer hitch assembly 17 in a manner to be later described.

A wire clip 57 of a substantially rectangular shape has one end attached to the free outer end of the piston 56 so that the other end thereof is in a spaced relation with the piston. By virtue of this arrangement the clip 57 constitutes an extension on the piston 56 adapted for connecting the piston with the casing member 18.

This connection is accomplished by the provision of a connecting pin 58 (FIGS. 2 and 3) having an over-all length substantially equal to the over-all vertical dimension of the casing member 18. The pin 58 is of a square shape in transverse section and is of a reduced section at its lower or driven end 59, with this reduced section being circular in transverse area. Adjacent its rear end 19 the top wall 27 of the casing member 18 is formed with a square opening 61 to snugly receive the pin 58, and the bottom wall 49 of the casing member 18 is formed with a round opening 62, coaxially aligned with the opening 61, and adapted to receive the reduced section 59 of the pin 58. As clearly appears in FIG. 2 the openings 61 and 62 are centered transversely of the casing member 18 and located between the links 44 at positions rearwardly of the rollers 36.

With the extended portion of the wire clip 57 arranged in a centered and aligned relation with and between the openings 61 and 62, the pin 58 is inserted within the opening 61 and the clip 57 to a stop position defined by the reception of its driven end 59 within the opening 62. The pin 58 thus constitutes a substantially rigid abutment on the casing member 18, being held against lateral linear movement by the casing walls 27 and 49 and against rotational movement by the interlocking action of the peripheral contours of the openings 61 and pin 58.

As thus far described it is seen that the combination unit 53, links 44 and rollers 36 are movable together relative to the casing member 18, and to the piston 56, so that retraction and extension of the piston is the result of the movement of the cylinder 54 relative to the piston 56.

The outer hitch assembly 17 (FIGS. 2 and 4) includes a tubular casing member 63 of a size to receive in a nested relation therein the casing member 18 of the hitch assembly 16. Secured to the rear end 64 of the casing 63, so as to form a rearwardly projected extension thereof, is a tubular casing section 66 of a reduced size relative to the casing member 63. Spaced forwardly from the junction of the casing member 63 with its extension 66, and formed in the side walls 67 of the casing member 63 is a pair of transversely aligned openings 68. Mounted on the top of the casing 63 and at the front end thereof is a roller unit indicated generally at 69.

This roller unit 69 includes a pair of side frame members 71 (FIGS. 2 and 5) and a pair of guide rollers 72, extended transversely of the casing member 63 and rotatably supported at opposite ends of the frame members 71. Intermediate the guide rollers 72, the frame members 71 are rockably supported on a shaft 73 which is carried in a pair of oppositely arranged and upright mountings 74, each of which is secured as by welding to a corresponding side wall 67 of the casing member 63. As clearly appears in FIG. 2 the top wall 76 of the casing member 63 is removed or cut away from the front end of the casing member 63 to a position spaced rearwardly from the roller unit 69 to provide what shall be referred to as a roller working space 65.

The guide rollers 72 are of a like shape in size and as shown in FIG. 5 each roller 72 is of a generally spool shape having a peripheral surface of a concave contour in a direction axially of a roller. In other words each roller 72 has its smallest diameter at the axial center thereof and with the diameter of the roller progressively increasing toward the opposite ends thereof. The resultant reversed axial inclination of the peripheral portions 72a and 72b of each roller 72, at opposite sides of their axial centers, correspond substantially to the reversed inclination of the guide sections 29 and 29a of the track member 26 on the inner hitch assembly 16, so as to be adapted for bearing engagement therewith as shown in FIG. 5.

In use, the inner hitch assembly 16, as shown in FIG. 3, is positioned within the outer hitch assembly 17, as shown in FIG. 4, by first positioning the combination unit 53 within the front end of the casing member 63, with the track member 26 and guide roller unit 69 in like corresponding positions. To permit passage of the combination unit 53 within the casing member 63 it is necessary that a reservoir fill cap 78 first be removed. On positioning of the unit 53 within the reduced casing section 66 of the assembly 17, the cap 78 is replaced on the unit 53 through an opening 79 formed in the casing section 66 (FIG. 2).

The tubular shaft 37 for the rollers 36 is then axially aligned with the openings 68 in the casing member 63, for the reception therethrough of a locking bolt 81 (FIGS. 1 and 6). As a result of the locking action of the bolt 81 the casing member 63 is locked for movement with the rollers 36, links 44 and combination unit 53, relative to the casing member 18 and piston 56. It will also be seen that by virtue of the nested telescopic assembly of the casing members 18 and 63, that the locking pin 58 is held against movement in a direction longitudinally of the pin.

In the assembly of the hitch and brake actuating device 10, in the manner illustrated in FIG. 1, the reduced casing section 66 is secured, as by welding indicated at 82, to the tongue 83 of the tongue structure 11. This welding would take place prior to the insertion of the inner hitch assembly 16 within the outer hitch assembly 17, to eliminate any possible heat damage to the mechanism associated with the assembly 16.

Also as shown in FIG. 1, the coupling device 13 is secured by welding to the mounting plate 22, prior to the attachment of the plate 22 to the casing member 18 by the bolts 84. The plate 22 is of a channel-shape in transverse section (FIGS. 2 and 3) and of a length greater than the vertical dimension of the casing member 18, and of a width providing for the channel legs 86 being arranged in a back-to-back relation against corresponding side walls 23 of the casing member 18. Each leg 86 is formed with longitudinally spaced holes 87, arranged opposite each other.

In turn the casing member 18 has its side walls 23 formed with aligned openings 88, and carries a depending transverse tubular sleeve 89, with the spacing therebetween corresponding to the spacing between the holes 87. Any pair of opposite holes 87 may thus be aligned with the openings 88 and the tubular sleeve 89 for receiving the bolts 84, whereby to adjust the vertical height of the coupling device 13 for connection with the towing vehicle 14.

It is readily apparent that the efficient and safe operation of the trailer brakes is dependent upon a free relative longitudinal movement between the hitch assemblies 16 and 17, either during a straight pull or during any turning movement of the tractor and trailer. In other words any rubbing action between corresponding side walls of the casing members 18 and 63 must be eliminated or appreciably reduced to prevent any binding action therebetween which would impede or retard a free moving action between the casing members 18 and 63. This binding action is most likely to occur during a turning movement due to the side torque or thrust applied to the front end of the device 10, which results in the effecting of a cantilever action on the hitch assemblies 16 and 17, tending to move the hitch assembly 16 transversely relative to the hitch assembly 17.

With the hitch assemblies 16 and 17 connected together (FIGS. 2 and 5), the track member 26 is located within the working space 65 for coacting bearing engagement of its guide track sections 29 and 29a with the corresponding peripheral portions 72a and 72b of the guide rollers 72. By virtue of this coacting engagement the guide rollers 72 ride longitudinally of the track member 26 during any relative longitudinal movement between the casing members 18 and 63 during this relative longitudinal movement any tendency of relative transverse movement between the casing members 18 and 63 is prevented by the coaction of the reversely inclined guide track sections 29 and 29a with concave peripheral surface of the guide rollers 72.

Thus as shown in FIG. 2 any transverse movement of the casing member 18 toward the left, as viewed in FIG. 2, is resisted by the coacting engagement of the track section 29a with the peripheral portion 72a of the roller 72. In like manner the track section 29 cooperates with the peripheral portion 72b to resist transverse movement of the casing member 18 toward the right, relative to the casing member 63. As a result of this cooperative action of the guide rollers 72 and guide track sections 29 and 29a, the casing members 18 and 63 are maintained in a relative longitudinally centered relation, whereby a rubbing or frictional engagement between their corresponding side walls is eliminated.

By virtue of the rocking movement of the roller frame member 71 about the shaft 73, the rollers 72 are maintained in continuous engagement with the track sections 29 and 29a, in response to any variations of their peripheral surfaces, or in the surfaces of the track sections, due to machining tolerances or the like. The rollers 72, by virtue of their rockable support on the shaft 73 being located centrally therebetween, thus assist each other in maintaining continuous engagement with the track member 26. A cap or housing member 93 secured to the shaft 73 is arranged in a covering relation with the rollers 72 and the track member 26.

The corresponding top and bottom walls of the casing members 18 and 63 are maintained against frictional engagement by the riding action of the rollers 36 on the inner surfaces of the top and bottom walls of the casing member 18 (FIG. 6) and the support of the roller shaft 37 on the locking pin 81 which is carried in the side walls of the casing member 63.

In use, and with the device 10 assembled with the trailer 12 and tractor 14 as shown in FIG. 1, assume the trailer to be in a straight pull. During this action the shaft 37 for the rollers 36 is against the rear ends of the slots 24, and the piston 56 is in an extended position as shown for these parts in FIG. 2. As a result no fluid pressure is applied to the trailer brakes.

On the application of the tractor brakes the hitch assembly 17, the rollers 36 and the combination unit 63, except for the piston 56, all move together relative to the casing member 18 of the hitch assembly 16, to positions defined by the engagement of the shaft 37 with the front ends of the slots 24, as shown in FIG. 2. The movement provides for the retraction of the piston 56 within its associated cylinder 54 whereby to effect the necessary fluid pressure to actuate the trailer brakes.

It is seen therefore that this invention provides a hitch and trailer brake actuating assembly wherein a pair of telescoping hitch members 18 and 63 is held in a clearance relation at all times by the coaction of the guide roller unit 69 and track member 26 at one of the ends thereof, which coaction maintains the telescoping members against relative transverse movement; and by the rollers 36 at their other ends, being engageable with top and bottom side portions of the inner telescoping member 18 and supported on the outer telescoping member 63 to maintain the telescoping members against against relative vertical movement. As a result the telescoping members 18 and 63 are free at all times for longitudinal movement in a relative longitudinally centered relation.

Although the invention has been described with respect to a preferred embodiment thereof it is to be understood that it is not to be so limited since changes and modifications can be made therein within the full intended scope of this invention as defined by the appended claims.

We claim:

1. In a hitch and trailer brake actuator assembly for tractor trailer vehicles, (a) a pair of interconnected relatively movable telescoping hitch members, one attachable to a trailer and the other attachable to a tractor, (b) coacting means on said hitch members for limiting the relative longitudinal movement therebetween, (c) means for maintaining said hitch members in a transversely centered relation during relative movement thereof, including a roller unit rockably mounted on a frame and having a pair of transversely extended guide rollers, each said roller having a peripheral surface of an irregular contour, (d) means supporting said frame on the other one of said hitch members for rocking movement of said rollers longitudinally thereof, (e) a track member mounted on and extended longitudinally of the first one of said hitch members having a surface thereof corresponding in shape to said peripheral surfaces for bearing engagement therewith, and (f) a trailer actuating mechanism carried on the first one of said hitch members and operatively connected to the other one and responsive to relative movement of said members to actuate the trailer brakes.

2. In a hitch and trailer brake actuator assembly for tractor trailer vehicles, (a) a pair of tubular interconnected relatively movable telescoping hitch members, with the inner hitch member attachable to a tractor vehicle, said outer hitch member having a longitudinally extended opening in the top side and adjacent the forward end thereof, (b) coacting means on said hitch members for limiting the relative longitudinal movement therebetween, (c) means for maintaining said hitch members in a transversely centered relation during relative movement thereof including a roller having a peripheral surface of irregular contour, (d) means mounting said roller on said outer hitch member in a position extended transversely of and above the opening therein, (e) a track member mounted on the top side of said inner hitch member and located within said opening, said track member extended longitudinally of said inner hitch member and having the top surface thereof corresponding in shape to said peripheral surface for bearing engagement therewith, and (f) a trailer brake actuating mechanism carried on the outer hitch member and operatively connected to the inner hitch member and responsive to relative movement of said hitch members to actuate the trailer brakes.

3. In a hitch and trailer brake assembly for tractor trailer vehicles, (a) a pair of tubular interconnected relatively movable telescoping hitch members, the forward end of the inner hitch member being extendible and retractable from the forward end of the outer hitch member, said forward end of the inner hitch member attachable to a tractor and the rearward end of the outer hitch member attachable to a trailer, (b) coacting means on said hitch members for limiting the relative longitudinal movement therebetween, (c) means for maintaining said hitch members in a transversely centered relation during relative movement thereof including a transversely extended roller mounted on said outer hitch member adjacent the forward end thereof, said roller having a peripheral surface of an irregular contour, (d) a longitudinally extended track member mounted adjacent the forward end of said inner hitch member having a surface corresponding in shape to said peripheral surface for bearing engagement therewith, and (e) a trailer brake actuating mechanism carried on the outer hitch member and operatively connected to the inner hitch member and responsive to relative movement of said hitch members to actuate the trailer brakes.

References Cited by the Examiner

UNITED STATES PATENTS

| | | | |
|---|---|---|---|
| 2,051,522 | 8/36 | Graham | 188—112 |
| 2,082,398 | 6/37 | Hughes | 188—112 |
| 2,101,600 | 12/37 | Sandul | 188—112 |
| 2,483,074 | 9/49 | Swain | 188—112 |
| 2,642,961 | 6/53 | Teal | 188—112 |

FOREIGN PATENTS 519,088   12/55   Canada.

ARTHUR L. LA POINT, *Primary Examiner.*